United States Patent Office 3,244,526
Patented Apr. 5, 1966

3,244,526
BENZIMIDAZOLE CYANINE DYES CONTAINING IN α-POSITION A CARBOETHOXY GROUP ON THE METHINE CHAIN
Ralph A. Copeland, Binghamton, N.Y., assignor to General Aniline & Film Corporation, New York, N.Y., a corporation of Delaware
No Drawing. Filed Feb. 23, 1962, Ser. No. 175,357
4 Claims. (Cl. 96—106)

This invention relates to sensitizing dyes which are cyanine dye bases containing a benzimidazole nucleus and which are substituted on the methine chain by a carboethoxy group and to photographic emulsions containing such dyes.

It is known that cyanine dye bases with a cyano group α to a heterocyclic nucleus will sensitize photographic emulsions and, in this connection, reference is made to Brooker et al. United States Patents 2,345,094 and 2,393,743. Typically, these patents describe the preparation and use of sensitizing dyes with a cyano group α to the carbon atom of a benzothiazole or a quinoline nucleus to which the methenyl chain is joined.

The dyes of these patents do not exhibit outstanding properties as sensitizers in paper emulsions, whereas the dyes contemplated herein possess such properties. This is attributable to a different but very important structural feature between the dyes hereof and those disclosed in said prior patents.

U.S. Patent 2,918,369 discloses a cyanine dye containing a benzimidazole nucleus and having a cyano group on the methine chain that is α to the carbon atom in said nucleus. The dyes of my invention do not contain a cyano group on the methine chain, but contain instead a carboethoxy group on the methine chain. The dyes of this invention have a sensitivity of the order of intensity of the dyes of Patent 2,918,369 and with a hypsochromic shift.

It is an object of this invention to provide novel cyanine dye bases containing a benzimidazole nucleus and a carboethoxy group on the methine chain.

It is a further object of this invention to provide silver halide emulsions, particularly paper emulsions, sensitized with the novel dyes of this invention.

Other objects and purposes will become apparent as the description proceeds.

The sensitizing dyes contemplated herein have the following general formula:

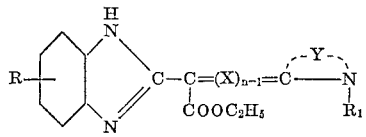

wherein R is hydrogen or alkyl, such as methyl, ethyl, propyl or the like; alkoxy, such as methoxy, ethoxy, propoxy, butoxy and the like; halogen, such as chloride, bromide or iodide; $R_1$ is alkyl, such as methyl, ethyl, propyl or the like; Y is the non-metallic atom necessary to complete a 5- or 6-membered heterocyclic ring system of the type usual in cyanine dyes, such as a thiazole, a benzothiazole, an oxazole, a benzoxazole, a selenazole, benzselenazole, quinoline, benzimidazole or the like; X represents a methine chain of 2 carbon atoms, a carbon atom of which may be substituted by alkyl, such as methyl, ethyl, propyl, butyl or the like; and $n$ represents a positive integer of from 1 to 4.

The above dyes are prepared by condensing a 2-carbethoxymethyl - benzimidazole with a cyclammonium quaternary salt of the type indicated above and containing in the reactive 2-position, a β-arylacylaminovinyl group. The carbethoxymethylbenzimidazole may bear a variety of substituents as previously indicated.

It is recommended that condensing agents be utilized to effect the reaction between the carbethoxymethylbenzimidazole and the cyclammonium quaternary salt. Such condensing agents should be basic in character. Condensing agents which I have found suitable are sodium acetate, triethylamine, piperidine and the like. It is preferable to carry out the condensations in a low-boiling organic solvent, such as an alcohol of low molecular weight as represented by methanol, ethanol and 1-propanol for example. Heat preferably to reflux accelerates the condensation.

The aforesaid cyanine dye bases form stable salts with certain acids, such as hydrochloric acid, hydrobromic acid, p-chlorotoluene sulfonate, and the like. These salts are much more soluble than the dye bases. The salts, when used in photographic silver halide emulsions, respond in the same way as the dye bases. With the salts, dye solutions of varying concentrations may be prepared.

The aforesaid dyes and their salts are used to sensitize silver halide emulsions, such as gelatino-silver halide emulsions; particularly paper emulsions, by adding thereto an amount ranging from about 1 to 40 mgs. per kilogram of emulsion. A peculiarity of these dyes and their salts is that they effectively sensitize in concentrations lower than those usual with known cyanine dyes.

The starting carboethoxymethylbenzimidazole may be prepared as originally described by me in Journal American Chemical Society 65, 1074 (1943) by alcoholysis of the nitrile. The 5(6) methyl derivative may be prepared in like manner. An alternative method resides in the condensation of diethyl mono-imino malonate hydrochloride with o-phenylenediamine.

The invention is illustrated by the following examples, it being understood, however, that such examples are illustrative and not limitative.

*Example I*

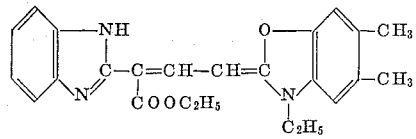

2-(α-carbethoxy-γ-[3-ethyl-5,6-dimethyl-2(3H)benzoxazolylidine]-propenyl)-benzimidazole 1.0 gram of 2-carboethyoxymethylbenzimidazole 2.3-grams of 2-acetanilinovinyl-5,6 dimethylbenzoxazole ethiodide, 15 ml. of methanol and 1 cc. of triethylamine were refluxed on a steam bath for three minutes. A deep yellow-orange solution formed. On chilling a yellow dye separated. This was filtered off and recrystallized from methanol. The dye in methyl alcohol shows a maximum of less than 400 mμ.

*Example II*

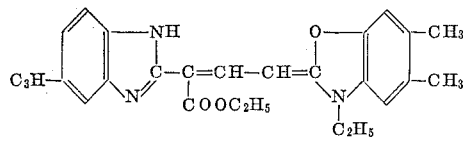

2-(α-carbethoxy-γ-[3-ethyl-5,6-dimethyl-2(3H)benzoxazolylidine]-propenyl)5(6)methylbenzimidazole 1.1 grams of 2-carbethoxymethyl-5-methylbenzimidazole, 2.3 grams of 2-acetanilinovinyl-5,6-dimethylbenzoxazole ethiodide, 15 ml. methanol, and 1 ml. of triethylamine were refluxed for 4 minutes on a steam bath. An intense yellow solution was formed. After filtering the solution and cooling, the dye separated. This material was recrystallized from n-propanol, and exhibited an absorption peak below 400 mμ.

Example III

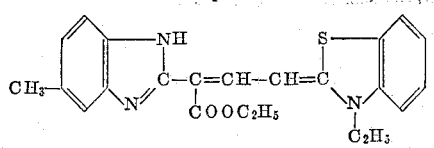

2-(α-carbethoxy-γ-[3-ethyl-2(3H)benzothiazolylidene]-propenyl)-5(6) methylbenzimidazole 1.12 grams of 2-acetanilinovinyl benzothiazole ethiodide, 0.55 gram of 2-carbethoxymethyl-6-methyl benzimidazole, 15 ml. of methanol, and 1 ml. of triethylamine were refluxed 5 minutes on a steam bath. On chilling, a red solid separated. This was boiled out two times with methanol. The solid was dissolved in ether, filtered free from a small amount of impurity. Evaporation of ether gave an orange-red solid, which was triturated with methanol. Absorption peak was 470 mμ with a strong sensitization in a paper emulsion.

Modifications of the invention will occur to persons skilled in the art and I, therefore, do not intend to be limited in the patent granted except as necessitated by the appended claims.

I claim:

1. A light sensitive silver halide emulsion containing as a sensitizing dye, a compound selected from the class consisting of those having the following formula:

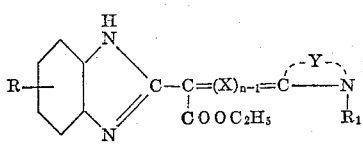

wherein R is a radical selected from the class consisting of hydrogen, halogen, alkoxy and alkyl; $R_1$ is alkyl; Y is a non-metallic atom necessary to complete a nitrogenous heterocyclic nucleus selected from the group consisting of benzoxazole and benzothiazole nuclei of the type usual in cyanine dyes and salts of said bases with strong acids; X is selected from the class consisting of a methine chain of 2 carbon atoms, and a methine chain of 2 carbon atoms, a carbon atom of which is substituted by a lower alkyl and $n$ is a positive integer from 1 to 4.

2. An emulsion as recited in claim 1 wherein the dye has the following formula:

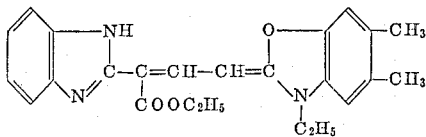

3. An emulsion as recited in claim 1 wherein the dye has the following formula:

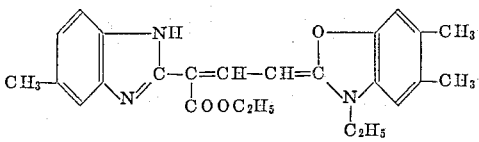

4. An emulsion as recited in claim 1 wherein the dye has the following formula:

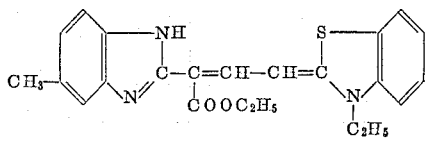

References Cited by the Examiner
UNITED STATES PATENTS

| | | | |
|---|---|---|---|
| 2,238,231 | 4/1941 | Riester et al. | 260—240.5 |
| 2,415,927 | 2/1947 | Anish | 96—106 |
| 2,435,865 | 2/1948 | Anish | 96—106 |
| 2,525,015 | 10/1950 | Beersmans | 96—106 |
| 2,918,369 | 12/1959 | Doorenbos | 96—106 |
| 2,984,664 | 5/1961 | Fry et al. | 260—240.5 |

FOREIGN PATENTS 812,924  5/1959  Great Britain.

OTHER REFERENCES

Fieser et al.: "Oraganic Chemistry," third edition, pages 218 and 225, Reinhold Publishing Co., New York (1956).

Galfkides: "Photographic Chemistry," vol. 2, page 808, Fountain Press, London (1960).

NORMAN G. TORCHIN, *Primary Examiner.*